(12) United States Patent
Eberling et al.

(10) Patent No.: US 9,002,610 B2
(45) Date of Patent: Apr. 7, 2015

(54) RELAY VALVE CONTROL ARRANGEMENT TO PROVIDE VARIABLE RESPONSE TIMING ON FULL APPLICATIONS

(75) Inventors: Charles E. Eberling, Wellington, OH (US); James M. Hamar, Strongsville, OH (US); Travis G. Ramler, Elyria, OH (US); John V. Ripley, Elyria, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 208 days.

(21) Appl. No.: 13/315,640

(22) Filed: Dec. 9, 2011

(65) Prior Publication Data

US 2013/0151105 A1  Jun. 13, 2013

(51) Int. Cl.
   *B60T 11/10* (2006.01)
   *B60T 11/28* (2006.01)

(52) U.S. Cl.
   CPC *B60T 11/10* (2013.01); *B60T 11/28* (2013.01)

(58) Field of Classification Search
   CPC ......... B60T 11/10; B60T 11/12; B60T 11/28; B60T 11/34
   USPC ............. 701/78, 82, 83; 303/113.1, 113.5, 10
   See application file for complete search history.

(56) References Cited

U.S. PATENT DOCUMENTS

| | | | | |
|---|---|---|---|---|
| 3,532,392 A | * | 10/1970 | Scharlack | 303/167 |
| 3,532,393 A | * | 10/1970 | Riordan | 303/167 |
| 3,556,615 A | * | 1/1971 | Stelzer | 303/115.5 |
| 3,893,696 A | * | 7/1975 | Urban et al. | 303/118.1 |
| 4,093,316 A | * | 6/1978 | Reinecke | 303/198 |
| 5,005,915 A | * | 4/1991 | Hart et al. | 303/22.2 |
| 5,100,207 A | * | 3/1992 | McKay | 303/22.2 |
| 5,106,168 A | * | 4/1992 | McKay | 303/22.2 |
| 5,171,069 A | * | 12/1992 | Peck et al. | 303/127 |
| 5,246,276 A | * | 9/1993 | Pajonk et al. | 303/9.62 |
| 5,425,573 A | * | 6/1995 | Mirlocca | 303/87 |
| 5,456,526 A | * | 10/1995 | Iwasa et al. | 303/113.5 |
| 5,480,221 A | * | 1/1996 | Morita et al. | 303/113.5 |
| 7,020,551 B2 | | 3/2006 | Goebels et al. | |
| 7,415,341 B2 | | 8/2008 | Goebels et al. | |

(Continued)

OTHER PUBLICATIONS

Bendix Service Data SD-13-47671, Bendix Single-Channel TABS-6 Advanced, Bendix Commercial Vehicle Systems LLC, Oct. 2008, pp. 1-28.

(Continued)

*Primary Examiner* — John Q Nguyen
*Assistant Examiner* — Michael Whalen
(74) *Attorney, Agent, or Firm* — Fay Sharpe LLP

(57) ABSTRACT

A brake system and related components including a metering device are configured to regulate a control signal received from a brake control device such that a control valve delays the supply of a level of requested braking pressure for a prescribed amount of time. The metering device can be an inversion valve and orificed check valve in a control circuit adapted to allow relatively unrestricted flow until a threshold pressure is reached, after which pressure the inversion valve closes and the flow is metered through an orifice. This has the effect of allowing rapid brake actuation to a first level, and then slowing further application of the brake until full requested braking is achieved. An electronic control unit can also be configured to regulate a control signal to delay development of the requested brake pressure.

7 Claims, 8 Drawing Sheets

(56) References Cited

U.S. PATENT DOCUMENTS

| | | |
|---|---|---|
| 7,577,509 B2 | 8/2009 | Goebels et al. |
| 7,690,735 B2 | 4/2010 | Bennett |
| 8,505,695 B2 * | 8/2013 | Kubick et al. ................ 188/71.8 |
| 2006/0261670 A1 | 11/2006 | Hatipoglu et al. |
| 2007/0029873 A1 | 2/2007 | Howell |
| 2013/0293000 A1 * | 11/2013 | Kubick et al. ................ 303/167 |

OTHER PUBLICATIONS

Bendix Service Data SD-03-1061, Bendix R-8 Relay Valve, Bendix Commercial Vehicle Systems LLC, Mar. 2004, pp. 1-4.
Bendix Service Data SD-03-1064, Bendix R-12 & R-14 Relay Valves, Bendix Commercial Vehicle Systems LLC, Mar. 2004, pp. 1-6.
Bendix Relay Valves, Air Brake Handbook BW5057, p. 23.

* cited by examiner

US 9,002,610 B2

RELAY VALVE CONTROL ARRANGEMENT TO PROVIDE VARIABLE RESPONSE TIMING ON FULL APPLICATIONS

BACKGROUND

The present exemplary embodiment relates to controlling pressure systems. It finds particular application in conjunction with control arrangements for controlling pressure in pneumatically operated vehicle system, and will be described with particular reference thereto. However, it is to be appreciated that the present exemplary embodiment is also amenable to other like applications.

Air brake systems installed on large vehicles typically utilize pressurized air to operate the brakes of the vehicle. Prior art air brake systems usually include a combination of three different braking systems, namely: the service brakes, the parking brakes, and the emergency brakes. The service brake system applies and releases the brakes when the driver uses the brake pedal during normal driving situations. The parking brake system applies and releases the parking brakes when the parking brake control is actuated. The emergency brake system utilizes portions of the service brake and may use the parking brake systems to stop the vehicle in the event of a brake system failure.

In most air brake systems, when the driver or vehicle operator applies the service brakes by depressing the brake pedal, pressurized air passes through the brake pedal, through a series of valves, and enters the brake chambers to apply the brakes. When the driver or operator releases the brake pedal, the air pressure in the brake chambers is released, thereby de-actuating the service brakes.

Existing and future federal regulations may require both i) a certain amount of braking torque to be developed by the braking system within a prescribed period of time, and ii) specify maximum vehicle stopping distances. To comply with these regulations, and in an attempt to otherwise provide the most effective braking possible, conventional brake systems are generally configured to provide up to a maximum braking power as quickly as possible when requested by a vehicle operator. In the event of wheel lockup, the vehicle's anti-lock brake system (ABS) activates and modulates the application of the vehicle's brakes to unlock the wheels.

BRIEF DESCRIPTION

The availability of full braking power as soon as possible if and when requested by an operator has been found to increase braking distances in some circumstances and, in particular, when such application of full braking power would result in wheel lockup and/or ABS activation. The present disclosure sets forth methods and devices for delaying the application of full braking power to achieve improved stopping distances. In one embodiment, the methods and devices are tuned to operate within the requirements of an exemplary regulation.

In accordance with one aspect, a brake system comprises at least one fluid pressure source, at least one brake unit, a pressure delivery line for delivering pressurized fluid to the at least one brake unit from the at least one fluid pressure source, a control valve for controlling the flow of pressurized fluid through the pressure delivery line to the at least one brake unit, the control valve operative to supply a requested delivery pressure to the at least one brake unit in response to a control signal, and a control circuit in communication with the control valve for controlling the control valve. The control circuit includes a user input device operative to generate the control signal indicative of a level of requested delivery pressure, and a metering device in communication with the user input device and configured to regulate the control signal received from the user input device such that the control valve delays the supply of the level of requested braking pressure for a prescribed amount of time.

The control valve can include a proportional relay valve, for example a relay valve with a piloting solenoid or a relay valve with an associated modulator, and the metering device can include a controller operative to regulate the control signal to delay the response of the proportioning relay valve. The proportioning relay valve and the controller can be supported in a common housing. The controller can be operative to receive the control signal, actuate the proportioning relay valve in a normal mode, where the pressure out equals the pressure in without additional delay until the delivery pressure exceeds a threshold value and, after the delivery pressure exceeds the threshold, regulate the control signal such that the control valve slows the rate at which the delivery pressure is increased above the threshold until the requested delivery pressure is reached. The controller can be operative to generate a pulse width modulated signal when the delivery pressure is above the threshold value.

The control circuit can be a fluid control circuit, such as in an air brake system, and the controller can be operative to sense a pneumatic control signal and, in response thereto, generate an electrical signal for controlling the proportioning relay valve. In another embodiment, the metering device can include an orificed check valve and inversion valve in the control circuit between the user input and the control valve, the orificed check valve operative to restrict flow above a prescribed threshold pressure and the inversion valve operative to permit relatively unrestricted flow of fluid through the control circuit to the control valve up to a prescribed threshold pressure, and to meter flow through the control circuit to the control valve above the threshold pressure. The threshold pressure can be, for example 0-200 PSI, and preferably about 60 PSI. The inversion valve can be configured to close at the threshold pressure such that when delivery pressure exceeds 60 PSI in the control circuit, flow through the orificed check valve is metered by the orifice.

In accordance with another aspect, an electronic control unit for controlling an associated control valve for supplying a delivery pressure to a brake unit of an associated brake system comprises an input for receiving a control signal indicative of a requested level of delivery pressure to be supplied to the associated brake unit by the associated control valve, a controller operative to regulate the control signal to delay the supply of the requested level of delivery pressure by a predetermined amount of time, and an output for communicating the control signal to the associated control valve. The controller can be configured to receive the control signal, actuate the associated control valve in a normal mode where the pressure out equals the pressure in without additional delay until the delivery pressure exceeds a threshold pressure, and after the delivery pressure exceeds the threshold pressure, regulate the control signal such that the associated control valve slows the rate at which the delivery pressure is increased above the threshold pressure until the requested delivery pressure is reached.

The threshold pressure can correspond to a delivery pressure of the associated control valve that is less than a maximum service pressure of the associated brake system. The controller can be operative to generate a pulse width modulated signal when the delivery pressure exceeds the threshold pressure. The controller can be configured to actuate the associated control valve in a normal mode until the control signal exceeds the threshold value. The electronic control unit and the control valve can be an integral unit, such as a relay control valve.

In accordance with another aspect, a brake system comprises at least one fluid pressure source, at least one brake unit, a pressure delivery line for delivering pressurized fluid to the at least one brake unit from the at least one fluid pressure source, a control valve for controlling the flow of pressurized fluid through the pressure delivery line to the at least one brake unit, the control valve operative to supply a requested delivery pressure to the at least one brake unit in response to a control signal, and a control circuit in communication with the control valve for controlling the control valve in response to a control signal indicative of a level of requested delivery pressure. The control valve is operative to delay full supply of the level of requested delivery pressure for a prescribed amount of time.

The control valve can include a proportioning relay valve, and can communicate with a controller operative to regulate the control signal to delay the response of the proportioning relay valve to thereby delay full supply of the level of requested delivery pressure for a prescribed amount of time. The proportioning relay valve and the controller can be supported in a common housing. The controller can be operative to receive the control signal, actuate the proportioning relay valve in a normal mode until the delivery pressure exceeds a threshold value and, after the delivery pressure exceeds the threshold, regulate the control signal such that the control valve slows the rate at which the delivery pressure is increased above the threshold until the requested delivery pressure is reached. The controller can be operative to generate a pulse width modulated signal when the delivery pressure is above the threshold value. The control circuit can be a fluid control circuit, and the controller can be operative to sense a pneumatic control signal and, in response thereto, generate an electrical signal for controlling the proportioning relay valve.

In accordance with another aspect, a method of controlling a delivery pressure to a brake chamber of a brake system comprises receiving at least one control signal indicative of a requested level of delivery pressure to be supplied to the brake chamber, supplying pressure to the brake chamber at a first rate up to a threshold pressure, and modulating the control signal to slow the rate that additional pressure is supplied to the brake chamber above the threshold pressure until the requested level of delivery pressure is met. The modulating of the control signal can include generating a pulse width modulated signal to delay development of the requested level of delivery pressure. The method can further include providing the pulse width modulated signal to a proportioning operatively connected to an associated relay valve, the pulse width modulated signal operative to decrease a rate of pressure rise supplied via the associated relay valve to the brake chamber of the brake system. The method can include supplying a maximum rate of pressure rise to the brake chamber until the delivery pressure exceeds the threshold pressure, and then modulating the control signal to slow the rate of pressure rise until the requested level of delivery pressure is reached.

In accordance with yet another aspect, an electronic control unit for an associated brake system comprises an input for receiving a control signal indicative of a requested level of delivery pressure to be supplied to an associated brake chamber of the associated brake system, means for modulating the control signal to supply delivery pressure at a first rate to the associated brake chamber up to a threshold pressure and, when the threshold pressure is exceeded, to supply delivery pressure at a second rate less than the first rate until the requested level of delivery pressure is reached, and an output for communicating the control signal to the associated control valve. The modulating the control signal can include generating a pulse width modulated signal for supplying deliver pressure to the associated brake chamber after the threshold pressure is reached.

DETAILED DESCRIPTION

Figure 1:
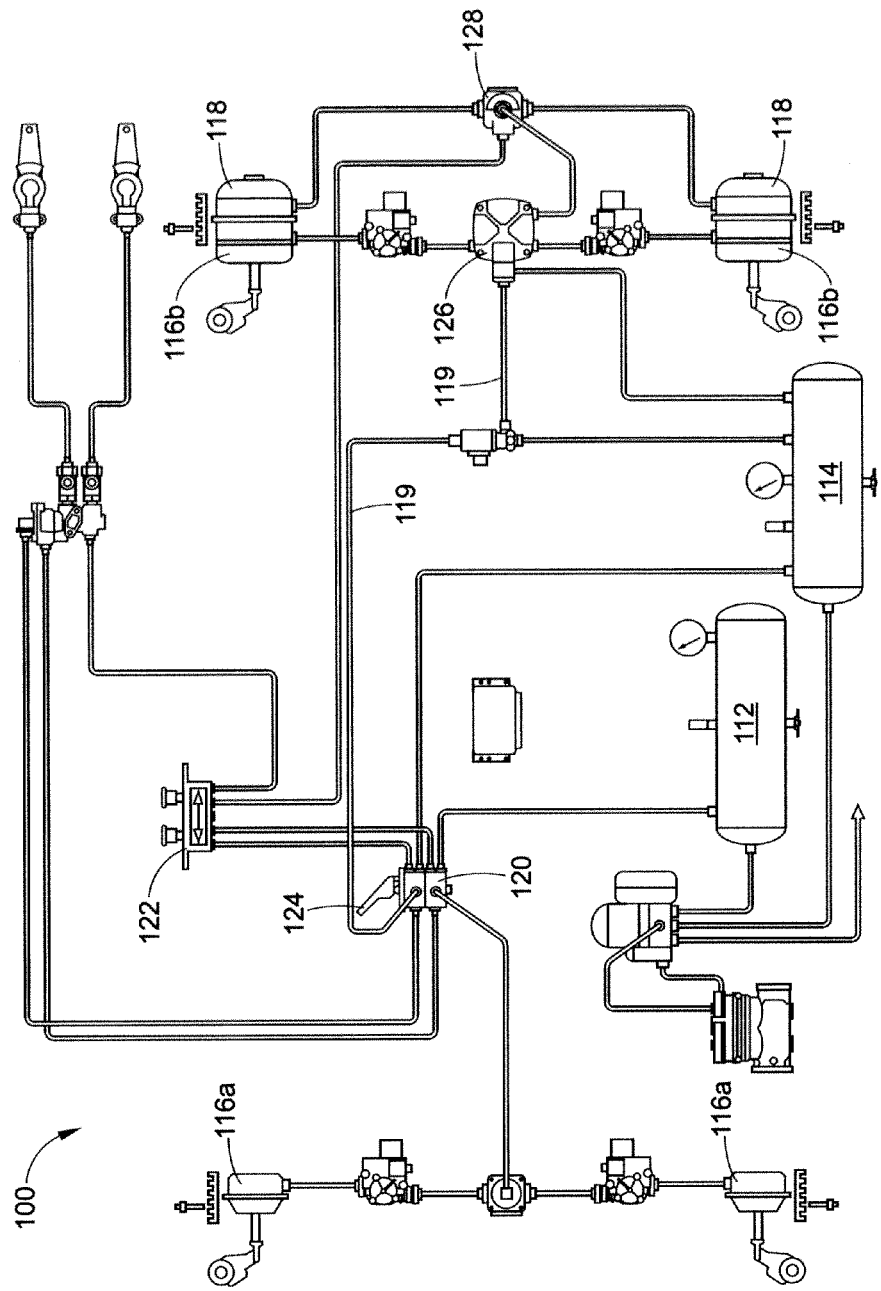
FIG. 1 is a partial schematic representation of a prior art air brake system.

With reference to FIG. 1, an exemplary prior art air brake system is illustrated. The brake system 100 includes a primary air reservoir 112 (typically for supplying a rear brake circuit) and secondary air reservoir 114 (typically for supplying a front brake circuit). The primary and secondary air reservoirs 112, 114 supply pressurized air to apply a set of front service brake assemblies 116a and rear service brake assemblies 116b, and for releasing a set of spring brake assemblies 118. A set of air lines 119 communicate the pressurized air from the reservoirs 112, 114 to the brake assemblies 116a, 116b, and 118.

The air brake system 100 may also include a brake valve 120 and a parking control valve 122. The brake valve 120 includes a foot pedal 124, which opens the valve when the pedal is depressed. When open, the brake valve 120 allows pressurized air to flow from the reservoirs 112, 114 to a relay valve 126 for actuating the service brakes. The parking control valve 122, which may be opened manually, allows pressurized air to flow from reservoirs 112, 114 to a quick release valve 128 (or relay valve) for releasing the parking brakes, as is known in the art. A typical prior art air brake system may also include a variety of additional valves and components, as is known in the art. For example, tractor protection valves, quick release valves, spring brake valves, etc. are often employed. These valves and components are known in the art and are omitted from the discussion of the prior art and exemplary embodiments of the present invention for simplicity. The brake system according to the present invention, however, may utilize these and other valves and components.

During operation of the prior art brake system 100, when an operator requests braking power via pedal 124, a control pressure is communicated from brake valve 120 to relay valve 126 via line 119. During a panic or emergency stop, the relay valve 126 receives the control signal and acts to provide full braking torque as soon as possible. As noted above, this can result in premature wheel lockup and increased stopping distances.

Figures 2, 3:
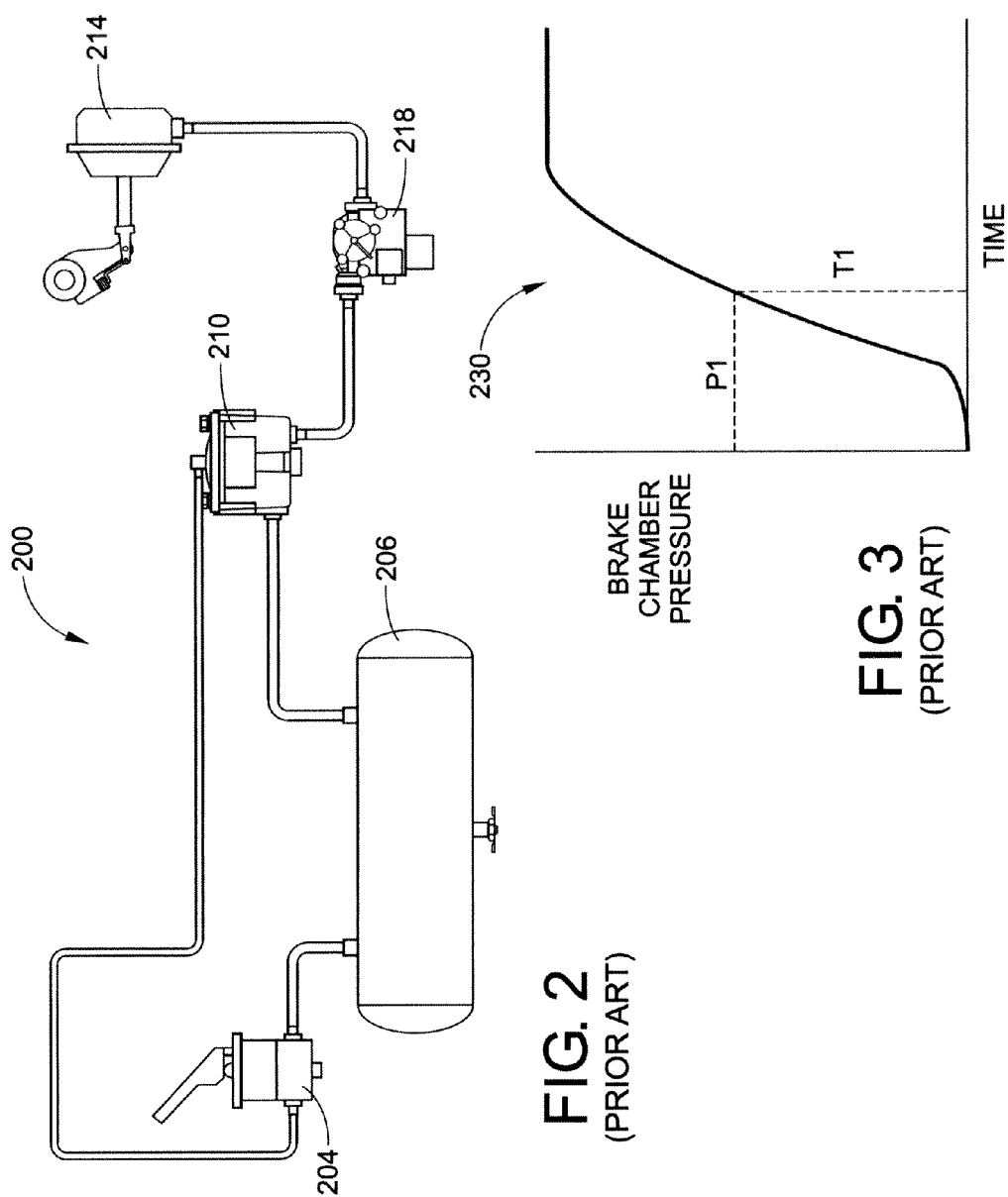
FIG. 2 is diagram of a simplified prior art brake system.
FIG. 3 is a graph illustrating brake chamber pressure versus time for the brake system of FIG. 3.

With further reference to FIGS. 2 and 3, a simplified prior art braking system 200 is illustrated including a brake valve 204 connected to a supply tank 206 and a relay valve 210. The relay valve 210 is also connected to the supply tank 206, as well as a brake chamber 214 via an ABS modulator 218. Like the system 100, actuation of the brake valve 204 generates a control signal that is communicated to the relay valve 210, which in turn supplies service pressure to the brake chamber 214.

In FIG. 3, a graph 230 of brake chamber pressure over time is shown for the prior art braking system 200 when full braking power is requested by the vehicle operator. As will be appreciated, the brake chamber pressure initially rises very slowly for a short period of time, and then rapidly rises to a maximum value at a generally constant rate. This graph represents a typical curve for a conventional brake system, including the brake system of FIG. 1.

It has been found that the rapid application of full braking power, such as shown in the graph 230, can cause premature wheel lock up. As noted previously, such premature wheel lockup has been handled in the past via activation of the ABS system. Vehicle tests have demonstrated that optimizing threshold braking can improve vehicle stopping distances. Moreover, it has been found that in a vehicle such as a truck or a bus, for example, the wheels of the steer axle may lock first upon application of the brakes until the vehicle undergoes forward weight transfer. That is, the steer axle wheels may lock initially prior to the vehicle's weight shifting forward. After the initial braking period and during or after transfer of additional weight to the steer axle of the vehicle, the ABS system may be activated thereby unlocking the steer axle wheels. Once the steer axle is loaded, however, the extra weight increases the grip of the steer tires thereby allowing the steer axle to potentially effect even greater braking, and also potentially deactivating the ABS on the steer axle.

The cycle including initial braking, wheel lockup, ABS activation/deactivation results in a portion of the vehicle's weight being rapidly shifted onto and off of the steer axle. This effects the rear axle(s) of the vehicle in a somewhat inverse manner. For example, at initial application of the brakes, the tires of the rear axle(s) have a relatively large amount of grip and are less likely than the steer axle tires to lockup initially. After initial braking, however, the tires of the rear axle(s) are relieved of some of the vehicle's weight that has been transferred to the steer axle and experience reduce grip. As such, the tires of the rear axle(s) may then lockup causing the ABS system to activate. At about that same time, however, some of the weight originally transferred to the steer axle is returned to the rear axle(s) by virtue of the front tire lockup and/or ABS activation.

The process described in the previous paragraphs happens very quickly and may not be detected by a casual observer. It will be appreciated, however, that the back and forth transfer of weight between the steer axle and rear/drive axle(s) and the consequential activation of the ABS system can impact stopping distances.

Figure 4:
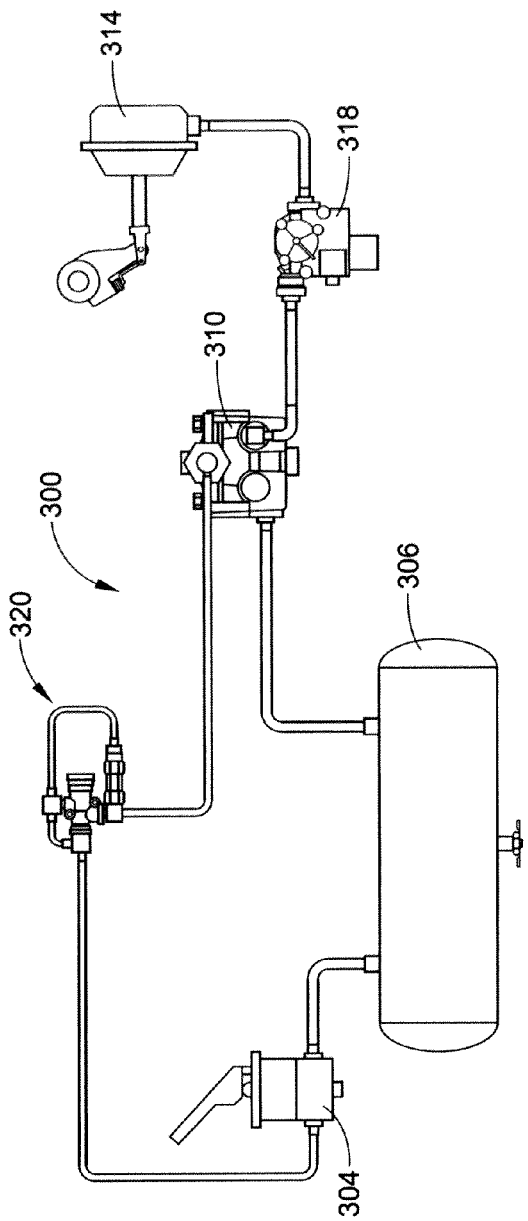
FIG. 4 is a diagram of an exemplary brake system in accordance with the disclosure.
Figure 6:
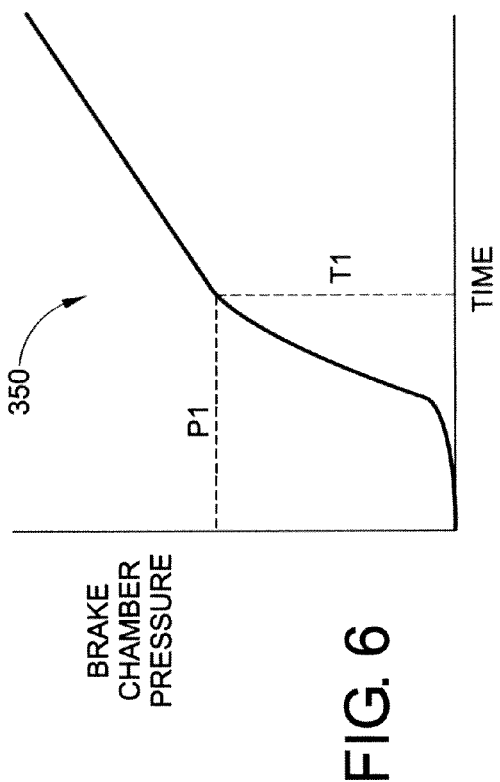
FIG. 6 is a graph illustrating brake chamber pressure versus time for the brake system of FIGS. 4 and 5.
Figure 5:
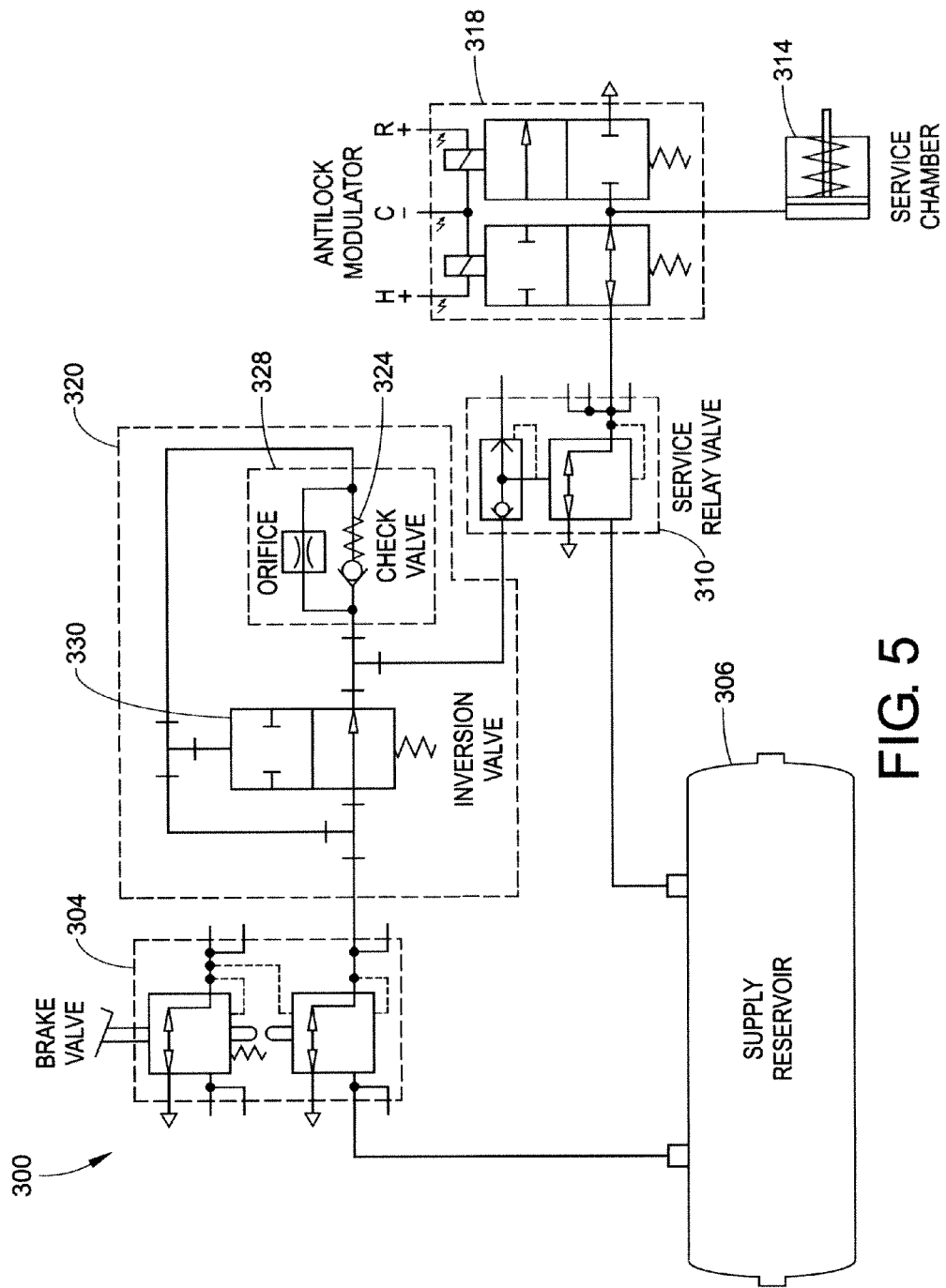
FIG. 5 is a schematic representation of the brake system of FIG. 4.

With reference to FIGS. 4-6, and initially to FIG. 4, a simplified brake system including a metering device in accordance with an embodiment of the disclosure is illustrated and identified generally by reference numeral 300. The brake system 300 is similar to brake system 200 and includes a brake valve 304 connected to a supply tank 306 and a relay valve 310. The relay valve 310 is also connected to the supply tank 306, as well as a brake chamber 314 via an ABS modulator 318. Like the system 200, actuation of the brake valve 304 generates a control signal that is communicated to the relay valve 310, which in turn supplies service pressure to the brake chamber 314 to effect braking. In most applications the control signal is a pneumatic control signal, but other types of control signals could be implemented including electric and/or hydraulic control signals. The relay valve 310 is configured to supply pressure to the brake chamber 314 in proportion to the pressure of the control signal.

In accordance with the disclosure, a metering device in the form of an orificed check valve 320 is installed between the brake valve 304 and the relay valve 310 in the control circuit. The orificed check valve and inversion valve 320 is configured to receive a control signal from the brake valve 304 and to regulate the control signal to delay development of a maximum braking torque by the brake by limiting the rate of pressure rise in the brake chamber 314. In one exemplary embodiment, the orificed check valve and inversion valve 320 operate to permit a rapid increase in pressure supplied by the relay valve 310 to the brake chamber 314 up to a predetermined level, and then operates to slow the rate of increase in pressure supplied by the relay valve 310 to the brake chamber 314 above the predetermined level. The net result is a rapid application of the vehicle's brakes up to a certain level, followed by a controlled increase in braking power above that level.

FIG. 5 is an ISO-1219 schematic illustration of the system 300, and the operation of the system will be described with reference to this figure. Similar reference numerals in FIGS. 4 and 5 refer to the same components. As will be appreciated, the orificed check valve and inversion valve 320 includes a check valve 324 and an orifice 328 arranged in parallel, and an inversion valve 330. When the pedal brake valve 304 is actuated by an operator, a pressure signal is communicated through the orificed check valve 320 to the relay valve 310. The pressure signal passes unimpeded through the inversion valve 330 until a threshold pressure is reached in the control circuit, at which point the inversion valve 330 closes. When the control signal exceeds the threshold pressure, the flow of the control signal pressure is metered by the orifice 328. Accordingly, the orificed check valve and inversion valve 320 is operative to permit unrestricted flow of fluid through the control circuit to the relay valve 310 up to a prescribed pressure below a maximum service pressure, and to meter flow through the control circuit to the relay valve 310 above the prescribed pressure.

The threshold pressure can be chosen based on a variety of factors depending on the application. For example, vehicle size, weight, loading, brake capacity, etc. all can provide a basis for determining the threshold pressure. The threshold pressure also can be arbitrarily set at a certain percentage of maximum braking power. For example, it may be desirable to set the threshold pressure at 60% of the maximum braking power such that, for braking commands requesting 0-60% the relay valve 310 is configured to respond as quickly as possible, and for braking commands exceeding 60% the command signal is regulated to slow the application of the brakes. Thus, by way of example, if a system is configured with the 60% threshold and a command signal is generated requesting 74% of maximum braking power, the system will rapidly initiate a braking sequence up to the 60% threshold, and then slow the rate of increase in braking power above 60% until 74% braking power is achieved.

It should now be appreciated that the result of the metering of the control signal is to allow a brake to develop torque as rapidly as possible during initial brake application up to a desired pressure, and then to slow the rate at which the brake develops additional torque up to the maximum requested brake torque. The effect of this metering is illustrated in FIG. 6, which is a graph 350 of brake chamber pressure versus time. As shown, the curve flattens significantly after P1,T1, which is the point after which the inversion valve 330 closes. As compared to the graph shown in FIG. 3, it can be seen that brake system 300 takes longer to develop the maximum requested chamber pressure. At no time, however, is maximum brake torque unavailable. The metering of the control signal has only delayed development of maximum braking.

This has the effect of preventing wheel lockup during initial braking by limiting the braking torque that can be developed for a short period of time. During this short period of time, the vehicle can undergo weight transfer from the rear axle(s) to the steer axle. After the load transfer is stabilized, the system then allows maximum braking force to be generated. Thus, when properly implemented, the system allows initial braking, weight transfer, and then maximum braking to be implemented in a smooth manner, thus eliminating any back and forth weight shifting and/or ABS activation of the prior art systems.

In one embodiment, the inversion valve is set to close at approximately 60 PSI. Of course, different closing pressures can be implemented depending on the application and the desired metering characteristics. In most applications, the inversion valve will be set to close at a pressure that corresponds to a significant application of the brakes, but less than the maximum service pressure of the brake system. It will also be appreciated that the size of orifice 328 dictates the rate of brake pressure rise after the inversion valve 330 closes. A relatively small orifice results in a slower rate of brake pressure rise, while a relatively larger orifice results in a steeper rate of brake pressure rise prior to the inversion valve 330 closing.

Figure 7:
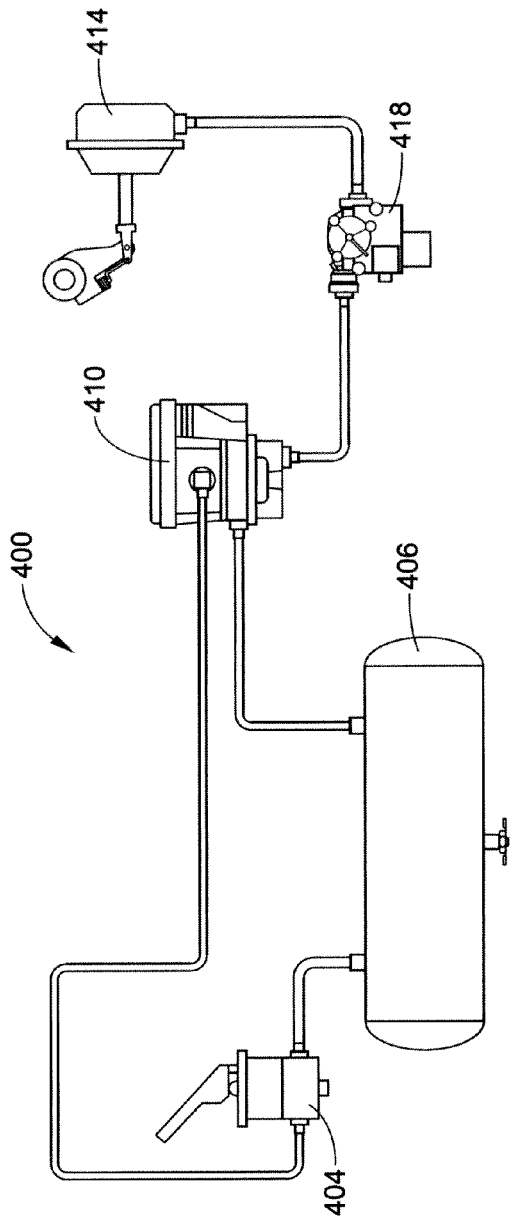
FIG. 7 is a diagram of another exemplary brake system in accordance with the disclosure.
Figure 8:
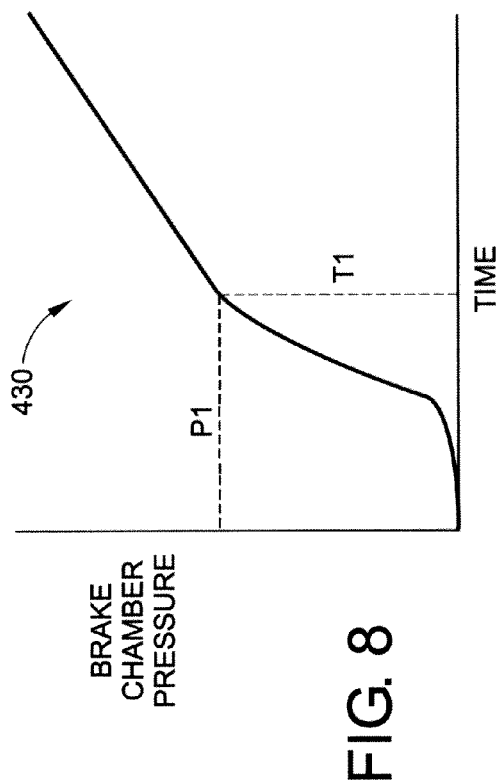
FIG. 8 is a graph illustrating brake chamber pressure versus time for the brake system of FIG. 7.

Turning to FIG. 7, another embodiment of a brake system in accordance with the disclosure is illustrated. In this embodiment, an electropneumatic relay valve is configured to meter the control signal to achieve the designed performance. Like brake system 300, brake system 400 includes a brake valve 404 connected to a supply tank 406 and a relay valve 410. The relay valve 410 is also connected to the supply tank 406, as well as a brake chamber 414 via an ABS modulator 418. Like the system 300, actuation of the brake valve 404 (user input) generates a control signal indicative of a requested level of delivery pressure to be supplied to the brake chamber 414. The control signal is communicated to the relay valve 410, which in turn supplies the delivery pressure to the brake chamber 414 to effect braking. In most applications the control signal is a pneumatic control signal, but other types of control signals could be implemented including electric and/or hydraulic control signals. As will be appreciated, the electropneumatic relay valve 410 in this embodiment is operative to flatten the pressure versus time curve after P1,T1, as shown in a graph 430 of FIG. 8.

Figure 9:
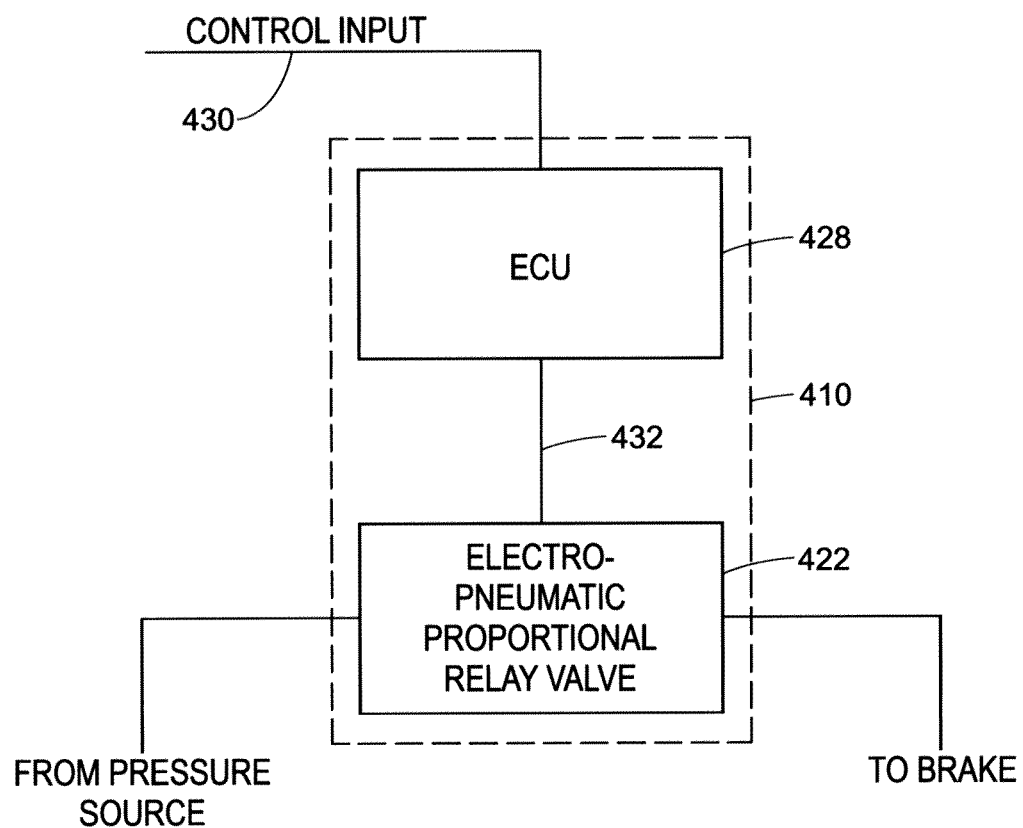
FIG. 9 is a schematic illustration of an exemplary relay valve including an electronic control unit.

In this embodiment, the relay valve 410 can include an electric proportioning valve and a controller configured to control the proportioning valve to regulate the control signal to delay development of the maximum braking torque. With reference to FIG. 9, a basic exemplary relay valve 410 is illustrated that includes a proportioning valve 422 and an electronic control unit (ECU) 428 for controlling the proportioning valve 422. The ECU 428 includes an input 430 for receiving an input control signal, such as from the brake valve 404 (FIG. 7). The ECU 428 is operatively connected to the proportioning valve 422 via an output 432 for communicating an output control signal thereto. The proportioning valve 422 is operative to deliver, in response to the output control signal, a desired pressure to a brake unit or other component for effecting braking action. In the past, such a proportioning valve 422 would be operative to control the delivery pressure supplied to the brake chamber in direct proportion to the control signal throughout the range of braking.

As will be appreciated, in accordance with the present disclosure the ECU 428 is operative to receive the control signal, actuate the proportioning valve 422 in a normal mode until the delivery pressure exceeds a threshold pressure (e.g., operate in a normal/conventional mode), and after the delivery pressure exceeds the threshold pressure, regulate the control signal such that the control valve 422 slows the rate at which the delivery pressure is increased above the threshold pressure until the requested delivery pressure is reached. To slow the rate of increase in the delivery pressure, the ECU 428 can be configured to generate a pulse width modulated control signal (or otherwise regulates the control signal) when the delivery pressure exceeds the threshold pressure.

The ECU 428 and the proportioning valve 422 can be separate components or can be provided in a common housing. For example, the ECU 428 can be provided in a control circuit as a separate component adapted to control a conventional proportioning operated relay valve. One example of a suitable relay valve is disclosed in commonly-assigned U.S. Pat. No. 7,577,509 issued on Aug. 18, 2009, which is hereby incorporated herein by reference in its entirety. Alternatively, it will be appreciated that the ECU of the relay valve disclosed in U.S. Pat. No. 7,577,509 could be configured to regulate a control signal in a manner as set forth in the present disclosure (e.g., pulse-width modulation). Alternatively, a modulator can be cycled to meter the air.

Figure 10:
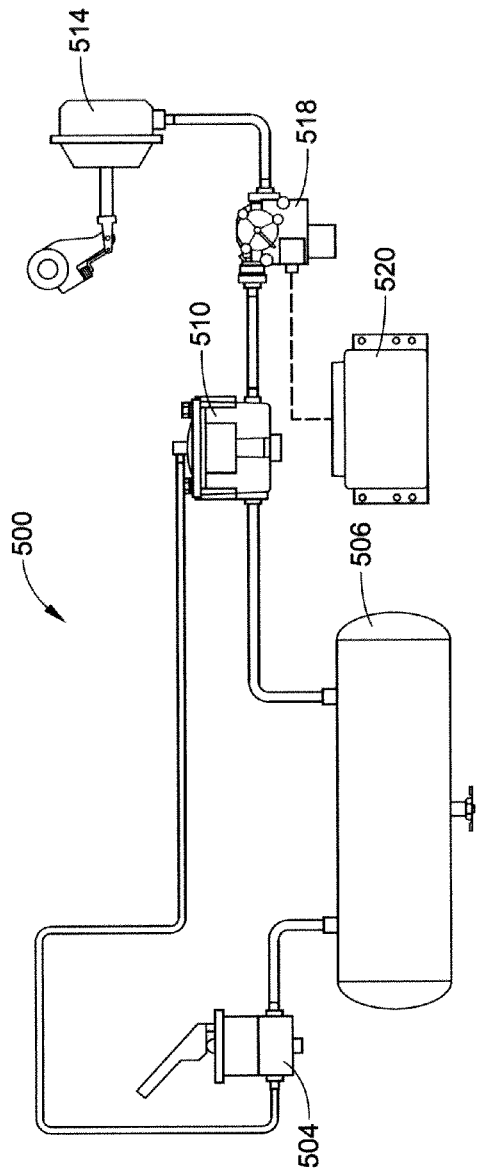
FIG. 10 is a diagram of another exemplary brake system in accordance with the disclosure.

Referring now to FIG. 10, yet another exemplary brake system in accordance with the disclosure is illustrated. In this embodiment, an ABS modulator is configured to regulate application of the brakes in a similar manner as the previously described embodiments. Like brake system 400, brake system 500 includes a brake valve 504 connected to a supply tank 506 and a relay valve 510. The relay valve 510 is also connected to the supply tank 506, as well as a brake chamber 514 via an ABS modulator 518. Like the system 400, actuation of the brake valve 504 (user input) generates a control signal indicative of a requested level of delivery pressure to be supplied to the brake chamber 514. The control signal is communicated to the relay valve 510, which in turn supplies the delivery pressure to the brake chamber 514 to effect braking. In most applications the control signal is a pneumatic control signal, but other types of control signals could be implemented including electric and/or hydraulic control signals.

Figure 12:
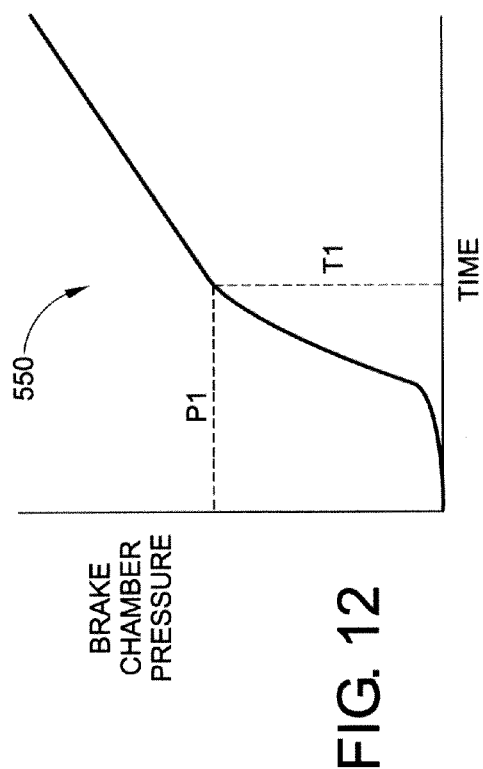
FIG. 12 is a graph illustrating brake chamber pressure versus time for the brake system of FIG. 10.
Figure 11:
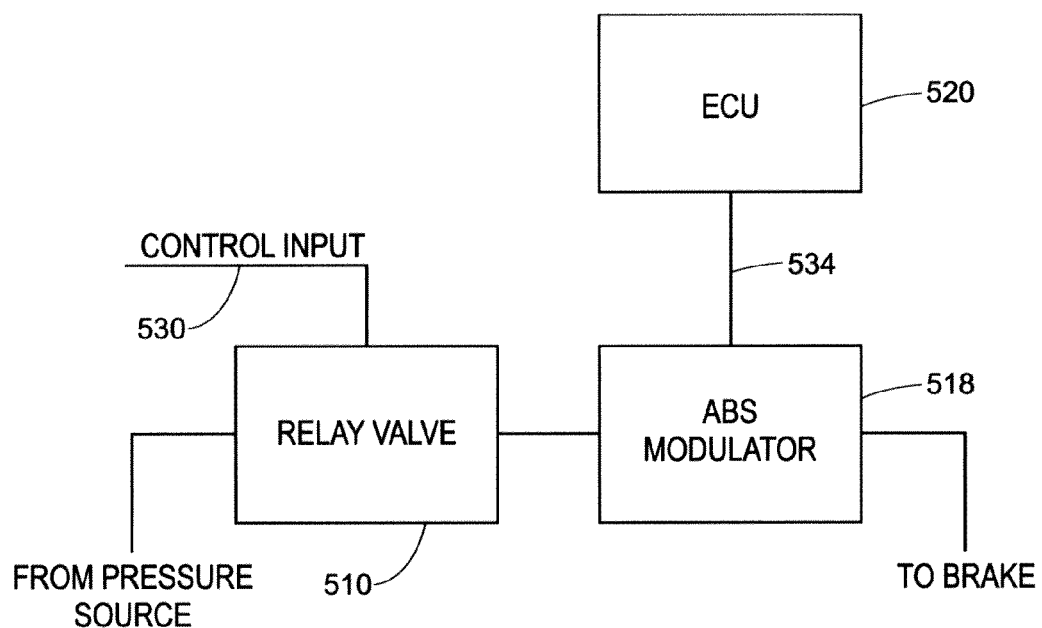
FIG. 11 is a block diagram of a portion of the system of FIG. 10.

In this embodiment, an ECU 520 is configured to control the ABS modulator 518 to achieve a desired braking effect. With reference to FIG. 11, the exemplary relay valve 510 receives a control input 530 from foot valve 504. The relay valve 510 in turn supplies the requested pressure to the brake chamber 514 via ABS modulator 518. The ECU 520 is operatively connected to the ABS modulator 518 via an output 534 for communicating an output control signal thereto. The ECU 520 may be in communication with other vehicle systems and/or sensors, and can be configured to let the ABS modulator 518 operate in a normal mode until the delivery pressure supplied to the brake chamber 514 exceeds a threshold pressure (e.g., operate in a normal/conventional mode). After the delivery pressure exceeds the threshold pressure, the ECU 520 can be configured to instruct the ABS modulator 518 to operate in second mode to slow the rate at which the delivery pressure is increased above the threshold pressure until the full requested delivery pressure is reached. As will be appreciated, the ECU 520 and ABS modulator 518 are operative to flatten the pressure versus time curve after P1,T1, as shown in a graph 550 of FIG. 12.

As used herein the terms braking, brake torque, brake power etc. refer to the amount of braking power that an operator of a vehicle is requesting via the user input (e.g., foot pedal). It is to be understood that the actual generated braking power will vary in practice based upon a wide range of factors and, thus, typically will not perfectly match the requested braking power. In addition, it should be appreciated that the term "requested level of delivery pressure" refers to a value associated with the control signal, whereas the "delivery pressure" refers to the actual pressure delivered by the control valve or commanded to be delivered by the control valve. Thus, at any given time the requested level of delivery pressure and the actual delivery pressure may be different. Also, the actual delivery pressure can be inferred from the control signal and, thus, need not be measured or otherwise monitored. To this end, the pressure threshold referred to in this disclosure can include inferred delivery pressure as commanded by the command signal.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A brake system comprising:
   at least one fluid pressure source;
   at least one brake unit;
   a pressure delivery line for delivering pressurized fluid to the at least one brake unit from the at least one fluid pressure source;
   a control valve operative to receive a control signal indicative of a level of requested delivery pressure and, in response thereto, open to permit the flow of pressurized fluid through the pressure delivery line to the at least one brake unit to thereby supply a requested delivery pressure to the at least one brake unit; and
   a control circuit in communication with the control valve for controlling the control valve; wherein the control circuit includes:
   a user input device operative to generate the control signal indicative of a level of requested delivery pressure; and
   a metering device in communication with the user input device and configured to regulate the control signal received from the user input device such that the control valve delays full supply of the level of requested braking pressure for a prescribed amount of time;
   wherein the control circuit is a fluid control circuit, and the metering device includes an orificed check valve and inversion valve in the control circuit between the user input and the control valve, the inversion valve operative to permit relatively unrestricted flow of fluid through the control circuit to the control valve up to a prescribed threshold pressure, and to meter flow through the control circuit to the orifice check valve above the threshold pressure.

2. The brake system as set forth in claim 1, wherein the control valve includes a proportioning relay valve, and communicates with a controller operative to regulate the control signal to delay the response of the proportioning relay valve.

3. The brake system as set forth in claim 2, wherein the proportioning relay valve and the controller are supported in a common housing.

4. The brake system as set forth in claim 2, wherein the controller is operative to receive the control signal, actuate the proportioning relay valve in a normal mode until the delivery pressure exceeds a threshold value and, after the delivery pressure exceeds the threshold, regulate the control signal such that the control valve slows the rate at which the delivery pressure is increased above the threshold until the requested delivery pressure is reached.

5. The brake system as set forth in claim 4, wherein the controller is operative to generate a pulse width modulated signal when the delivery pressure is above the threshold value.

6. The brake system as set forth in claim 2, wherein the control circuit is a fluid control circuit, and wherein the controller is operative to sense a pneumatic control signal and, in response thereto, generate an electrical signal for controlling the proportioning relay valve.

7. The brake system as set forth in claim 1, wherein the threshold pressure is 60 PSI, and the inversion valve is configured to close at 60 PSI such that when pressure exceeds 60 PSI in the control circuit, flow through the orificed check valve is metered by the orifice.

\* \* \* \* \*